(12) United States Patent
Hanchinal et al.

(10) Patent No.: US 10,719,647 B2
(45) Date of Patent: Jul. 21, 2020

(54) SPEED CONVERTER FOR FPGA-BASED UFS PROTOTYPES

(71) Applicant: Synopsys, Inc., Mountain View, CA (US)

(72) Inventors: Ramesh Hanchinal, Karnataka (IN); Sunil Raidurgam Venkat, Karnataka (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/434,435

(22) Filed: Jun. 7, 2019

(65) Prior Publication Data
US 2019/0377846 A1    Dec. 12, 2019

(30) Foreign Application Priority Data
Jun. 7, 2018  (IN) .............................. 201811021241

(51) Int. Cl.
*G06F 30/34*    (2020.01)
*G06F 13/40*    (2006.01)
(Continued)

(52) U.S. Cl.
CPC .......... *G06F 30/34* (2020.01); *G06F 13/1668* (2013.01); *G06F 13/4027* (2013.01); *G06F 2119/12* (2020.01)

(58) Field of Classification Search
CPC ... G06F 30/34; G06F 13/1668; G06F 13/4027
See application file for complete search history.

(56) References Cited

U.S. PATENT DOCUMENTS 8,296,505 B2 * 10/2012 Min .................... G06F 13/1668
                                                    365/185.33
9,477,620 B2   10/2016 Kim et al.
(Continued)

OTHER PUBLICATIONS

Arasan Chip Systems, Inc. Datasheet—UFS 3.0 Total IP Solution, 2018, 45 pages.

*Primary Examiner* — Stacy Whitmore
(74) *Attorney, Agent, or Firm* — Bever, Hoffman & Harms, LLP

(57) ABSTRACT

A method for generating FPGA-based prototype systems capable of implementing UFS HS-G4 communication protocols using inexpensive/slow FPGAs. ASIC/SoC-targeted circuit designs are modified to include a speed converter that causes a UFS controller to generate transmitted data streams at one-half operating speed (e.g., 146 MHz) during HS-G4 operations, modifies the transmitted data streams to intersperse filler data values between transmitted data values, and transmits the modified data streams to M-PHY physical interconnect devices (PIDs) at full speed (e.g., 292 MHz). The speed converter also receives full-speed HS-G4 data streams that include both data and filler values and causes the UFS controller to operate at one-half operating speed (e.g., 146 MHz) such that only data values are read. PLD-based prototype systems that include separate M-PHY PIDs mounted on PCBs are efficiently configured to implement the modified circuit design. A prototyping tool automatically incorporates the speed converters into submitted ASIC/SoC-targeted circuit designs.

10 Claims, 9 Drawing Sheets

(51) Int. Cl.
*G06F 13/16* (2006.01)
*G06F 119/12* (2020.01)

(56) References Cited

U.S. PATENT DOCUMENTS

| | | | |
|---|---|---|---|
| 2010/0100666 A1* | 4/2010 | Min | G06F 13/1668 |
| | | | 711/103 |
| 2016/0005488 A1 | 1/2016 | Han et al. | |
| 2017/0200715 A1* | 7/2017 | Sekar | H01L 27/2436 |

* cited by examiner

| RATE | Data Rate (Mbps) | Phy Symbol period (ns) | Symbol Clock frequency at 40bit RMMI (MHz) |
|---|---|---|---|
| HS-G3 operation | | | |
| A | 4992 | 2 | 128 |
| B | 5830.4 | 1.715 | 146 |
| HS-G4 operation | | | |
| A | 9984 | 1 | 250 |
| B | 11660.8 | 0.8575 | 292 |

SPEED CONVERTER FOR FPGA-BASED UFS PROTOTYPES

RELATED APPLICATIONS

This application claims priority from Indian Provisional Application No. 201811021241 entitled "SPEED CONVERTOR LOGIC TO ENABLE HS G4 (11.8 Gbps) OPERATION IN FPGA", which was filed on Jun. 7, 2018, and is incorporated by reference herein.

FIELD OF THE INVENTION

The present disclosure generally relates to prototype systems and methods that are utilized during the development of integrated circuit (IC) devices, and more specifically to FPGA-based prototype systems/methods utilized during the development of mobile IC devices that implement Unified Protocol (UniPro) high-speed interface technology.

BACKGROUND OF THE INVENTION

In today's complex and everchanging digital world physical prototyping has become a de-facto industry standard during the development of Application Specific Integrated Circuit (ASIC) designs and System-on-Chip (SoC) designs (collectively referred to herein as circuit designs) to assure first-pass silicon success during subsequent fabrication on silicon. Physical prototyping involves constructing a prototype circuit/system in which one or more programmable logic devices (PLDs; e.g., field programmable gate arrays (FPGAs), programmable logic arrays (PLAs) and programmable array logic (PALs)) and zero or more component devices are operably configured to produce a physical implementation of the circuit design, thereby allowing the circuit designers to verify that a physical device implementing the IC meets established functional requirements. The importance of prototyping has increased because minimizing both time-to-market and cost-to-reach-market have never been more important to the commercial success of modern IC devices, and because generating and testing a physical prototype that implements a circuit design requires substantially less time and expense than generating and testing a fabricated ASIC or SoC "chip" that implements the circuit design. That is, by prototyping a circuit design before submitting the circuit design to a fabrication facility for generation as ASIC, flaws in the circuit design that were not detected during simulation can be identified and corrected with substantially less time and expense. Moreover, physical prototyping enables rapid verification and validation of any last-minute modifications to the final circuit design by way of reconfiguring the PLD(s) that implement the circuit design.

A problem recently encountered with physical prototyping involves validation of circuit designs requiring data transmission speeds/rates that are greater than those supported by the PLDs utilized in an established prototype hardware platform. That is, the operating speed of a given PLD is inherently slower than a corresponding ASIC due to the programmable switches that facilitate the reconfigurability of the PLD. This puts an additional challenge on PLD-based physical prototype platforms when tasked to implement circuit designs requiring high speed data transmissions because such circuit designs are typically generated for a specific ASIC fabrication technology that supports the higher speeds; i.e., when such circuit designs are implemented in slower PLDs, timing specifications (e.g., controller timing requirements) established in the ASIC-targeted circuit design code cannot be validated using the PLD-based prototype platform. Note that it is not easy to change the timing requirements to meet prototyping needs, for example, to verify timing closure of the circuit design when implemented in a PLD that cannot support the higher speed/timing requirements. Moreover, changing or upgrading a target PLD to meet higher speed requirements would be expensive in terms of both time and cost as this approach would require the design and bring-up of a new prototype hardware platform.

The above-mentioned problem associated with established PLD-based prototype platforms is particularly relevant to circuit designs that implement JEDEC Universal Flash Storage (UFS) protocols. The UFS protocol has become the mobile storage standard of choice for today's high-end smartphones, tablets and cameras, mainly due to its performance and high bandwidth over other existing solutions. These advantages have become critical to meet end users' requirements for higher responsiveness and increased capabilities. For example, end users expect to transmit and receive their high-resolution photos and videos in seconds amid the high volume of files and other operations, and currently only the UFS protocol meets these expectations. To implement the UFS protocol, a circuit design typically includes a UFS host controller operably connected to an MIPI M-PHY interface layer in the manner depicted in FIG. 8. In particular, the UFS controller is typically implemented using a UniPro IP/standard cell to provide a data transmission (or link) layer along with the additional circuitry depicted in FIG. 8, a MIPI M-PHY (specification standard cell) to provide a physical interconnect layer, and a standard Reference M-PHY Module Interface (RMMI) to provide data and control signal transmissions between the UFS controller and the M-PHY. MIPI M-PHY would support High-Speed Gear 4 in Version 4.1 and so MIPI UniPro has come up with High Speed Gear 4 specification in Version 1.8. UFS would leverage on both link and physical layers to achieve high speed data transfer. In this document, references to UFS host controller are intended to reference the various components included in FIG. 8, including a UniPro link layer (e.g., UniPro Layer V1.8 or higher), as well as operable connection to a standard RMMI interface between UFS host controller and MIPI M-PHY 4.0 or 4.1.

FIG. 9 depicts an exemplary conventional prototype platform 50 made up of a host printed circuit board (PCB) 51-1 and a device PCB 51-2 are operably connected to each other and to a PC system 59. A programmable logic device (PLD) 52-1 is mounted on PCB 51-1 and is configured to implement a host circuit design 53-1 along with a UFS controller 54-1 of an ASIC-targeted or SoC-targeted circuit design, and standard test circuitry 54-1 (e.g., a PC-input/output cell) that facilitates communication with PC system 59. An M-PHY physical interface device (M-PHY PID) 55-1 is mounted on a daughter card that is attached to PCB 51-1 and connected to UFS controller 54-1 by way of a 40-bit RMMI bus 56-1. Device PCB is similarly composed with a PLD 52-2 configured to implement a device design 53-2, a second UFS controller 54-2 and test circuitry 54-2, with a second M-PHY PID 55-2 mounted thereon and connected to UFS controller 54-2 by way of a 40-bit RMMI bus 56-2. PC system 59 may be configured to mimic and perform data traffic exchanges between the host and device.

A problem with prototype system 50 is that this arrangement requires direct transmission of M-PHY generated clock signals at speeds that cannot be supported by the PLD-implemented UFS controller. That is, the transmission speed of data from UFS controller 54-2 to M-PHY PID 55-2 over RMMI bus 56-2 during data transmission operations is controlled by a clock signal Tx_SymbolClk, and the transmission speed of data from M-PHY PID 55-2 to UFS controller 54-2 over RMMI bus 56-2 during data reception operations is controlled by clock signal Rx_SymbolClk, where both Tx_SymbolClk and Rx_SymbolClk are generated by the M-PHY circuitry. In order to perform 11.6 Gigabit-per-second (Gbps) HS-G4 data transmissions over signal lines 58 using this conventional prototype platform the M-PHY circuitry must generate the Tx_SymbolClk and Rx_SymbolClk at 292 MHz (i.e., each of the 40 lines forming RMMI bus 55-1 must carry data at 292 MHz). This means that the UniPro layer IP of UFS controller 54-1 must operate at a speed that meets the 292 MHz frequency requirement, which cannot be supported by many existing PLD-based prototype platforms. Moreover, addressing this problem by increasing the RMMI interface width (e.g., by way of increasing the transmission/reception channels of RMMI buses 56-1 and 56-2 from 40-bits to 80-bits) to reduce the speed requirements on the UFS controllers is not practical because this would require significant changes to the ASIC-targeted circuit design code, and would also double the number of required PLD output pins (i.e., PLD 51-1 and 51-2 may not have sufficient available I/O pins to support this solution).

What is needed is a cost-effective physical prototyping approach that facilitates validating the functionality of a circuit design at operating speeds that exceed the capabilities of a prototype platform's component PLDs. What is particularly needed is a prototyping approach that facilitates validating controller timing requirements during UFS HS-G4 data transmissions without requiring modification of the ASIC-targeted circuit design code.

SUMMARY OF THE INVENTION

The present invention is directed to a method that facilitates prototyping ASIC-targeted or SoC-targeted circuit designs using FPGAs (or other programmable logic devices (PLDs)) that cannot support HS-G4 data transmissions by way of generating a modified version of the circuit design that includes a speed converter module in the RMMI (standard interface) bus between the UFS controller and the MIPI M-PHY layer, and then generating a physical prototype system that implements the modified circuit design using at least one FPGA/PLD and an M-PHY physical interconnect device (M-PHY PID) that are operably connected by a suitable interconnect structure, where the FPGA/PLD is configured to implement the UFS controller and other processing/functional circuitry of the circuit design, the M-PHY PID is configured to implement the M-PHY layer, and the interconnect structure implements a portion of the RMMI interface bus. According to an aspect of the invention, the speed converter module is configured (a) to receive a low-speed (first) data stream transmitted from the UFS controller and includes data values transmitted at a low (first) frequency (e.g., 146 MHz), (b) to convert the low-speed data stream into a high-speed (second) data stream that includes predetermined "filler" values interspersed within the data values (e.g., such that each sequential pair of data values is separated by one or more filler values), and (c) to transmit the high-speed data stream to the M-PHY PID at a high (second) frequency (e.g., 292 MHz) that facilitates re-transmission of the data/filler from the M-PHY PID at the required HS-G4 data transmission speed (e.g., 11 Gbps). With this arrangement, the speed converter module facilitates validation of controller timing requirements during HS-G4 data transmissions by providing test data to the M-PHY at the required higher frequency (e.g., 292 MHz) while the UFS controller operates at the lower operating frequency (e.g., 146 MHz). Accordingly, the present invention greatly reduces prototyping costs by facilitating validation of controller timing requirements of ASIC/SoC-targeted circuit designs that implement HS-G4 (or other high speed) transmissions using less-expensive (slower) FPGAs/PLDs without requiring changes to the ASIC/SoC-targeted circuit designs.

According to another aspect of the invention, the speed converter module is implemented in a manner that minimizes or entirely avoids changes to UFS controller and the M-PHY layer defined in the ASIC/SoC-targeted circuit design. In one embodiment, the methodology includes effectively dividing the RMMI interface bus into two portions such that the speed converter module is coupled to the UFS controller by a first bus portion and coupled to the M-PHY layer by a second bus portion, whereby all data and relevant control/clock signals transmitted on the RMMI bus in the ASIC/SoC-targeted circuit design being intercepted by the speed converter module. For example, during HS-G4 transmissions the speed converter receives the low-speed original (first) data stream from the controller via the first bus portion and transmits the high-speed modified (second) data stream to the M-PHY layer via the second bus portion. By placing the speed converter between the UFS controller and the M-PHY layer in this manner, and by configuring the speed converter module to intersperse filler data into the modified (second) data stream, the present invention allows the UFS controller to transmit a HS-G4 test data stream at half-speed frequencies (i.e., 146 MHz) that is effectively received at the M-PHY layer at full-speed frequencies (i.e., 292 MHz) without requiring modification of the UFS controller or the M-PHY layer descriptions in the ASIC/SoC-targeted circuit design code. Similarly, during receive operations, the speed converter is configured to effectively remove filler data from a high-speed (third) data stream received from the M-PHY layer via the second bus portion and to pass the resulting data values in a low-speed (fourth) data stream that can be read by the UFS controller from the first bus portion while operating at the low-speed (first) frequency. By instantiating the speed converter in the RMMI bus between the UFS controller and the M-PHY layer in this manner, and by configuring the speed converter to add filler data to transmission (first) data streams and to effectively remove filler data from received (third) data streams, the present invention allows the UFS controller to operate at half-speed (i.e., 146 MHz) during all HS-G4 communications, thereby facilitating prototyping of the UFS controller using slow/inexpensive FPGAs/PLDs while facilitating validation of timing requirements during UFS HS-G4 data transmissions without requiring significant modification of the ASIC/SoC-targeted circuit design code.

According to a presently preferred embodiment the speed converter module is implemented in the same FPGA/PLD that implements the UFS controller to minimize costs associated with generation of a physical prototyping system. Specifically, the process of generating the physical prototype system involves configuring logic resources of the FPGAs/PLDs to implement the UFS controller and the speed converter module, whereby at least part of the first RMMI bus portion and part of the second RMMI bus portion are necessarily also implemented on the FPGAs/PLDs to facilitate the required signal paths between the UFS controller and the M-PHY PID (i.e., by way of input/output resources of the FPGAs/PLDs). In other embodiments the speed converter module may be implemented as part of the M-PHY PID or on a separate ASIC.

According to a presently preferred embodiment, the speed converter module is configured to selectively control the operating speed of the UFS controller by way of modifying (e.g., dividing by two) the standard symbol clock signals Tx_SymbolClk and Rx_SymbolClk generated by the M-PHY layer during high-speed (e.g., HS-G4) transmit/receive (TX/RX) operations. That is, the operating speed of a standard UniPro IP layer V1.8 IP, which forms part of a standard UFS controller, is controlled during data transmissions by transmission symbol clock signal Tx_SymbolClk and during data reception operations by a reception symbol clock signal Rx_SymbolClk, where symbol clock signals Tx_SymbolClk and Rx_SymbolClk are generated at frequencies designated by a standard MIPI M-PHY 4.0/4.1 layer. For example, during a typical HS-G4 (11.6 Gbps) TX operation, the M-PHY layer generates symbol clock signal Tx_SymbolClk at 292 MHz, which (i.e., in the absence of a speed converter module) would cause the UFS controller (specifically, the UniPro IP) to transmit the associated high-speed data stream at 292 MHz. By way of contrast, during lower speed TX operations, the M-PHY layer generates symbol clock signal Tx_SymbolClk at an appropriate lower frequency (e.g., 146 MHz), whereby the UFS controller transmits the associated low-speed data stream at the lower frequency. The present invention utilizes this standard UFS feature to maintain the operating speed of the UFS controller at frequencies that can be supported by a prototype systems FPGA/PLD resources by way of configuring the speed converter module to intercept and modify (e.g., divide by two) the symbol clock signals Tx_SymbolClk and Rx_SymbolClk only during HS-G4 (or other high-speed) operating modes, and to pass unmodified symbol clock signals Tx_SymbolClk and Rx_SymbolClk to the UFS controller during operations other than HS-G4.

In one embodiment, the speed converter module is configured to determine (e.g., by way of the assertion/de-assertion of associated flag signals generated by the UFS controller) when each communication operation is being performed at high speed (HS-G4), and to modify the corresponding symbol clock signal Tx_SymbolClk or Rx_SymbolClk such that the UFS controller processes the associated HS-G4 data stream at the lower frequency. This arrangement allows the speed converter module to maintain the operating speed of the UFS controller at a desired frequency (i.e., 146 MHz) without requiring changes to the UniPro IP or the M-PHY 4.0/4.1 specifications established in the ASIC/SoC-targeted circuit design code. Specifically, during HS-G4 TX operations, the M-PHY 4.0/4.1 layer generates the Tx_SymbolClk signal at 292 MHz (as defined by the ASIC/SoC-targeted circuit design code), the speed converter module modifies (e.g., divides by two) the Tx_SymbolClk signal to generate a modified Tx_SymbolClk/2 signal at 146 MHz, and the UFS controller operates in compliance with the modified signal Tx_SymbolClk/2 to transmit an associated high-speed data stream at 146 MHz (which is also in compliance with the ASIC/SoC-targeted circuit design code). The high-speed (first) data stream generated by the UFS controller is then modified as described above by the speed converter module such that the modified high-speed (second) data stream is received by the M-PHY 4.0/4.1 layer at the required Tx_SymbolClk frequency of 292 MHz (i.e., as defined by the ASIC/SoC-targeted circuit design code). In contrast, during TX operations other than HS-G4, the M-PHY 4.0/4.1 layer generates the Tx_SymbolClk signal at the corresponding lower frequency (e.g., 146 MHz), and the speed converter module is configured to pass the received Tx_SymbolClk signal without modification to the UFS controller, whereby the UFS controller generates a corresponding low-speed (fifth) data stream at the lower frequency (146 MHz) that is passed by the speed converter module without modification to the M-PHY layer, whereby this low-speed TX operation is also performed in compliance with the ASIC/SoC-targeted circuit design code.

In a similar manner, the operating speed (data reception speed) of data received by the UFS controller during HS-G4 reception operations is controlled by the modified reception symbol clock signal Rx_SymbolClk/2, which is generated by the speed converter module by modifying (dividing-by-two) the reception symbol clock signal Rx_SymbolClk generated by the M-PHY layer (e.g., when original signal Rx_SymbolClk is 292 MHz, modified signal Rx_SymbolClk/2 is 146 MHz). In one embodiment, the speed converter module is also configured to de-skew the Rx_SymbolClk/2 signal such that the rising edge of each sequential clock signal of the modified reception symbol clock signal "Rx_SymbolClk/2" coincides with the arrival of a corresponding sequential data value at the UFS controller, whereby the UFS controller reads all data values from each incoming HS-G4 data stream and effectively ignores all intervening filler data values. Conversely, when the Tx_SymbolClk and Rx_SymbolClk symbol clock signals generated by the M-PHY layer during non-HS-G4 data transmissions have a corresponding low frequency (e.g., 146 MHz or lower) that can be supported by the prototype system's FPGA/PLD implementing the UFS controller, the speed converter module passes the Tx_SymbolClk and Rx_SymbolClk symbol clock signals to the UFS controller in an unmodified form.

Additional embodiments and features are also described herein. In alternative embodiments various concepts and features of the present invention are implemented in an EDA prototyping tool, and implemented in prototype systems produced by the prototyping system/method. In other embodiments, the speed converter module includes additional features that facilitate the efficient production of prototype systems capable of also executing both HS-G4 A (i.e., 250 MHz) and B (i.e., 292 MHz) communication speeds without requiring modifications to ASIC/SoC-targeted circuit design code.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to improved prototyping methods, tools and systems for use in the production of ASICs and SoCs that implement UFS HS-G4 (or other) high-speed communication protocols. The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary embodiments. In the interest of not obscuring the presentation of embodiments of the claimed inventions, in the following Detailed Description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

Figure 1:
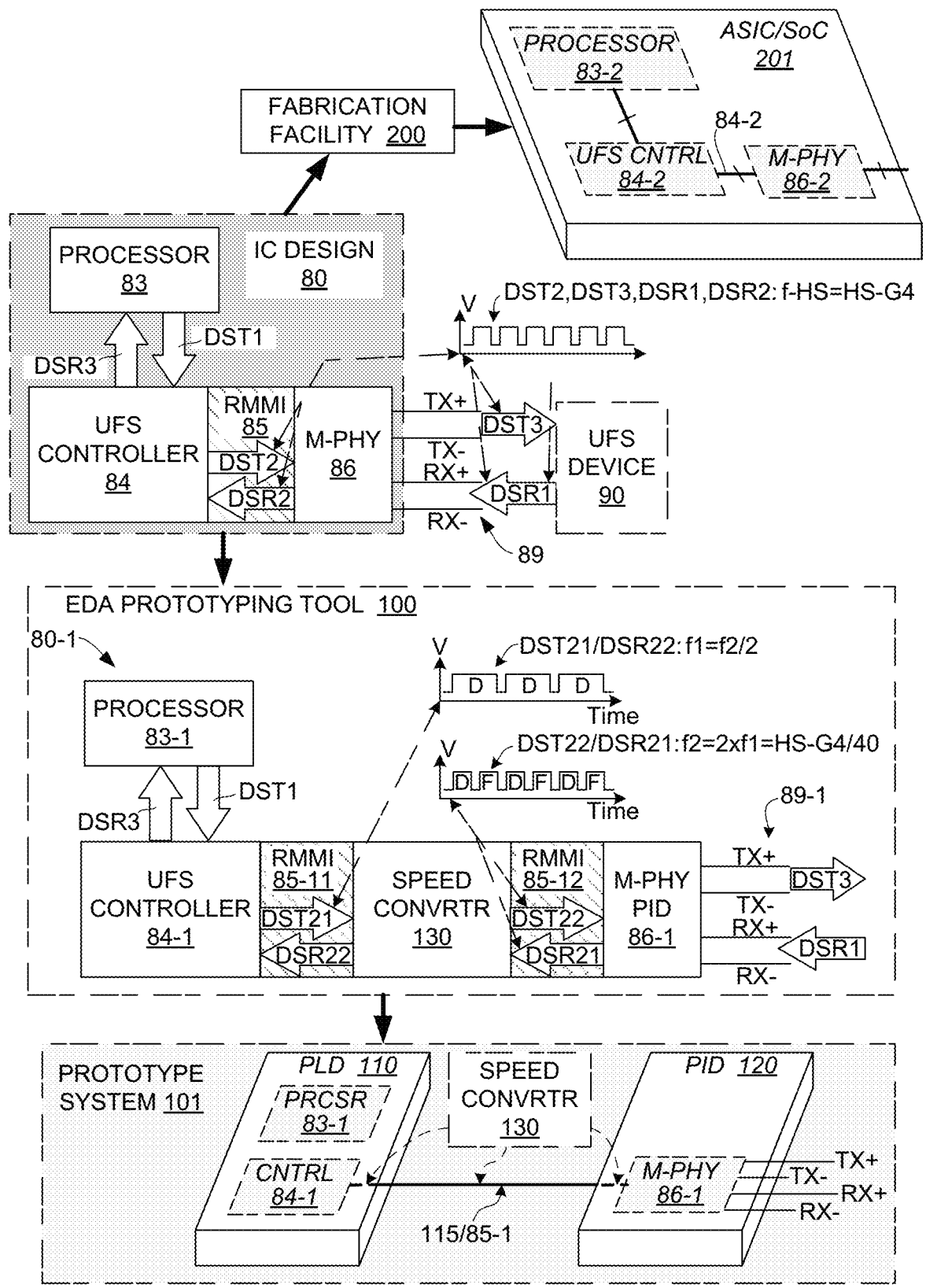
FIG. 1 is a diagram depicting a prototyping method, a prototyping tool and a prototyping system according to corresponding generalized embodiments of the present invention.

FIG. 1 depicts a generalized method for prototyping a circuit design 80 during development of circuit design 80 for fabrication of an ASIC or SoC device 201 by a fabrication facility 200. Circuit design 80 is written in a suitable hardware description language (HDL) such as Verilog and is characterized by way of including a UFS controller 84 and an M-PHY (physical interconnect) layer 86 that operably connected by a RMMI (standard interface) bus 85, whereby a processor 83 or other functional circuitry of circuit design 80 is able to communicate with an external device 90 (e.g., a flash memory device) using high-speed transmission frequency f-HS (e.g., the 11.6 Gbps frequency associated with UFS HS-G4 data communications between processor 83 and external device 90). Specifically, during data transmissions from processor 83 to external device 90, processor 83 generates a transmitted data stream DST1 that is passed to UFS controller 84, UFS controller 84 then configures the data in stream DST1 and transmits a corresponding parallel data stream DST2 over RMMI bus 85 to M-PHY 86, and then M-PHY 86 transmits the data as a serial data stream DST3 on transmission lane TX+ and TX− of UFS communication lines 89. Similarly, when processor 83 receives data from external device 90, a serial data stream DSR1 received by M-PHY 86 from reception lane RX+ and RX− of UFS communication lines 89 is reconfigured and passed on RMMI bus 85 as corresponding parallel data stream DSR2 to UFS controller 84, and then UFS controller 84 generates a final received data stream DSR3 in which the received data is presented in accordance with established constraints (e.g., speed/timing requirements established for proper operation of circuit design 80) to processor 83. In this context, high-speed transmission frequency f-HS refers to the data transmission frequency on each line of parallel interface bus 85 (e.g., to support serial 11.6 Gbps UFS HS-G4 data transmissions on communication lines 89, each line of a standard 40-bit RMMI bus must maintain a high-speed transmission frequency equal to 292 MHz). The prototyping method described below is typically performed before a final version of circuit design 80 is sent to fabrication facility 200, where physical ASIC or SoC device (chip) 201 is produced with corresponding integrated circuit structures that implement physical processor circuit 83-2, UFS controller circuit 84-2, RMMI circuit 85-2 and M-PHY circuit 86-2 in accordance with corresponding portions the final version of circuit design 80. That is, the proposed method for prototyping circuit design 80 is performed to verify that ASIC or SoC device 201 will function as desired before incurring the cost associated with the fabrication process.

Referring to the middle and lower portions of FIG. 1, the proposed method for prototyping circuit design 80 includes generating a modified circuit design 80-1, and then generating a physical prototype system 101 that implements the modified circuit design 80-1 using at least one programmable logic device (PLD) 110 and a physical interconnect device M-PHY PID 120.

In one embodiment the generation of modified circuit design 80-1 is performed using an EDA prototyping software tool 100 which, when executed on a suitable computing system, is operably configured to read-in circuit design 80 and to generate all data required to configure a target PLD-based prototyping system 101 such that prototyping system 101 emulates operations that would be performed by fabricated ASIC or SoC device 201. Specifically, prototyping tool 100 is configured to generate a modified circuit design 80-1 including a speed converter 130 disposed in the standard RMMI interface bus such that the speed converter 130 is coupled to the UFS controller 84-1 by a first RMMI bus portion 85-11 and to the M-PHY (physical interconnect) layer 86-1 by a second bus RMMI portion 85-12.

According to an aspect of the present invention, speed converter 130 is configured to function during high-speed data transmission operations by way of converting a first data stream DST21 including data values D that are received from UFS controller 84-1 via bus portion 85-11 at a low-speed (first) frequency f1 into a second data stream DST22 including both data values D and one or more filler values F that are transmitted to M-PHY layer 86-1 via second bus portion 85-12 at a high-speed (second) frequency f2 (e.g., two-times the low-speed frequency). According to an aspect of the invention, the low-speed (first) frequency f1 is determined by an operating speed that can be supported by a PLD of target PLD-based prototyping system 101, and the high-speed (second) frequency f2 is determined by the number of signal lines of the RMMI bus such that the second data stream DST22 can be re-transmitted from physical interconnect device M-PHY PID 120 on UFS communication lines 89 at a high-speed transmission frequency f-HS that corresponds with UFS HS-G4 transmissions (e.g., 11.6 Gbps). For example, when RMMI bus 85 includes 40-bit parallel transmissions, speed converter module is configured to transmit second data stream DST22 at a high-speed (second) frequency f2 of 292 MHz, whereby low-speed (first) frequency f1 may be a fraction (e.g., one-half) of frequency f2 (i.e., 146 MHz).

According to another aspect of the present invention, speed converter 130 is configured to function during high-speed data reception operations by effectively remove filler data values F from a high-speed (third) data stream DSR21 received from M-PHY layer 86-1 via second bus portion 85-12 such that only data values D are read from a low-speed (fourth) data stream DSR22 transmitted on first bus portion 85-11 by UFS controller 84-1 at low-speed (first) frequency f1. Effectively removing filler data value F from high-speed (third) data stream DSR21 may involve actual removal by speed converter module 130 (e.g., such that (fourth) data stream DSR22 is transmitted at low-speed frequency f1 on first bus portion 85-11 and only includes data values D), or may involve controlling UFS controller 84-1 to read only data values D (i.e., to ignore intervening filler values F) in the manner described below with reference to FIGS. 3 and 5.

By generating modified circuit design 80-1 including speed converter 130 disposed and configured as set forth above, the present invention allows the UFS controller 84-1 to operate at a substantially lower operating speed (e.g., half-speed, or 146 MHz) during all HS-G4 communications, thereby facilitating implementation of UFS controller 84-1 using slow/inexpensive FPGAs/PLDs that would not be capable of operating at 292 MHz while facilitating validation of timing requirements during UFS HS-G4 data transmissions without requiring significant modification of the ASIC/SoC-targeted circuit design code.

Referring to the lower portion of FIG. 1, once modified circuit design 80-1 is generated, PLD-based prototype system 101 is configured using data generated by prototyping software tool 100 to implement modified circuit design 80-1. As explained above, prototype system 101 includes an FPGA/PLD 110 and a physical interconnect device M-PHY PID 120 that are connected by a suitable interconnect structure 115. In one embodiment, generating physical prototype system 101 involves configuring FPGA/PLD 110 to implement UFS controller 84-1, processor 83-1 and other circuitry/logic associated with circuit design 80, with input/output resources of FPGA/PLD 110 and interconnect structure 115 configured to implement corresponding portions of RMMI interface bus 85-1 that facilitate communication between M-PHY 86-1, which is implemented on M-PHY PID 120 in the manner described above, and UFS controller 84-1.

According to a presently preferred embodiment that is described in additional detail below, prototype system 101 is further configured such that speed converter module 130 is implemented in FPGA/PLD 110. However, as indicated by the dashed-line arrows extending from speed converter module 130 at the bottom of FIG. 1, speed converter module 130 may alternatively be implemented on M-PHY PID 120 or on a separate device that is connected between FPGA/PLD 110, on M-PHY PID 120.

Figure 2:
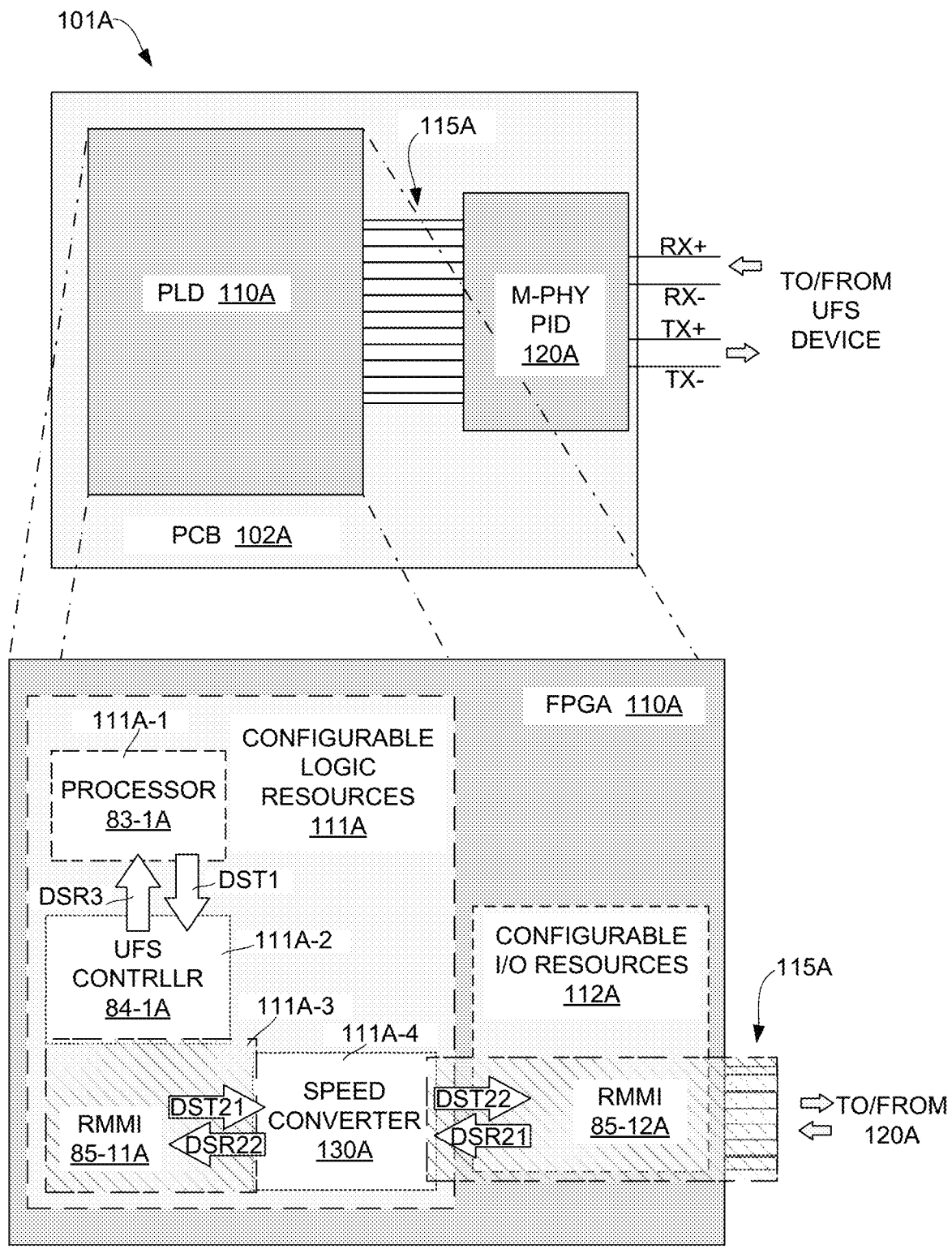
FIG. 2 is two-part diagram depicting a PLD-based prototype system portion according to an exemplary embodiment of the present invention.
Figure 9:
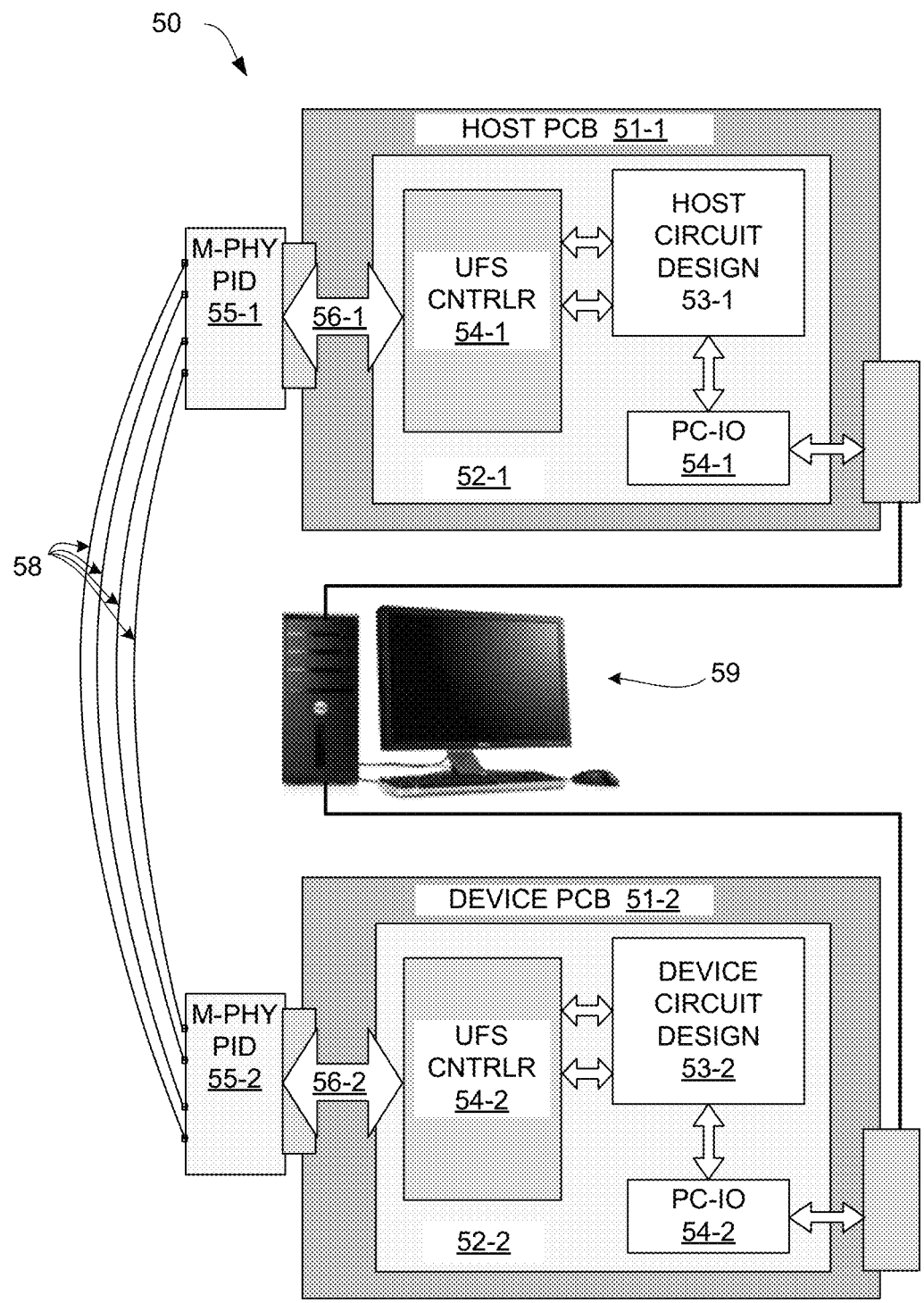
FIG. 9 is diagram depicting an exemplary conventional PLD-based prototyping system.

FIG. 2 depicts a PLD-based prototype system 101A according to a presently preferred embodiment portion according to an exemplary embodiment. Referring to the upper portion of FIG. 2, system 101A includes a field programmable gate array (FPGA) 110A and an M-PHY PID 120A that are mounted onto a printed circuit board (PCB) 102A and electrically connected by way of a physical connector 115A that implements part of the RMMI interface bus portion 84-12 shown in FIG. 1. M-PHY PID 120A is configured and operates substantially as described above with reference to M-PHY PID 55-1 (see background description related to FIG. 9). As indicated in the lower portion of FIG. 2, FPGA 110A includes logic resources 111A that configured such that a first partition 111A-1 implements processor 83-1A, a second partition 111A-2 implements UFS controller 84-1A, a third partition 111A-3 implements speed converter 130A, and a fourth partition implements (first) RMMI bus portion 85-11A. FPGA 110A also includes configurable input/output (I/O) resources 112A that are configured to implement at least a portion of (second) RMMI bus portion 84-12A, whereby output pins operably coupled to input/output resources 112A operably connect to corresponding signal lines of physical connector 115A to facilitate data and control signal transmissions between speed converter module 130A and M-PHY PID 120A.

Figures 3, 4:
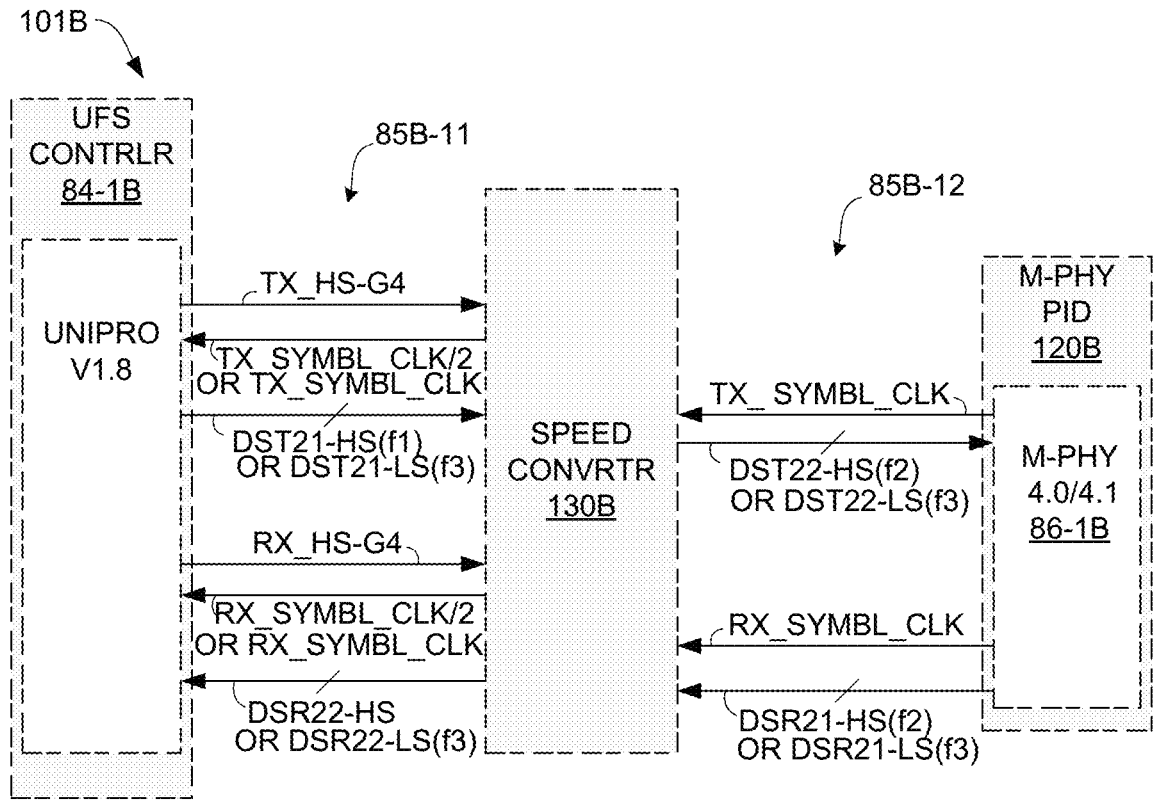
FIG. 3 is a simplified block diagram depicting a prototype system according to another exemplary embodiment of the present invention.
FIG. 4 is a table including data rage, PHY symbol period an symbol clock frequencies associated with UFS H3-G3 and H3-G4 operations.

FIG. 3 depicts a partial prototype system 101B including a speed convertor module 130B interfaced with UFS controller 84B-1 including a MIPI UniPro V1.8 layer and a M-PHY PID 120B including a standard MIPI M-PHY 4.0/4.1 layer. Data streams mentioned above that are transmitted on 40-bit RMMI bus portions 85B-11 and 85B-12 are indicated as high-speed data streams DST21-HS, DST22-HS, DSR21-HS and DSR22-HS. Similar to the previous embodiment, data stream DST21-HS is transmitted on RMMI bus portion 85B-11 at low frequency f1 (e.g., 146 Mhz), and data streams DST22-HS and DSR21 are transmitted on RMMI bus portion 85B-12 at high frequency f2 (e.g., 292 Mhz). In one embodiment, data stream DSR22-HS is transmitted on RMMI bus portion 85B-11 at high frequency f2, but UFS controller 84-1B is controlled as explained below to only read data values (i.e., not filler values) from data stream DSR22-HS while operating at low frequency f1, whereby UFS controller 84 receives only the data values transmitted in (third) data stream DSR21-HS at the lower (first) frequency f1.

According to an aspect of the present embodiment, speed converter module 130A is configured to determine whether low-speed or high-speed HS-G4 communications are being performed by way of flag signals TX_HS-G4 and RX_HS-G4, which are provided by (i.e., either directly generated or derived from) the MIPI UniPro V1.8 layer of UFS controller 84-1B. Specifically, UFS controller 84-1B asserts flag signal TX_HS-G4 to indicate the subsequent transmission of a corresponding high-speed data stream DST21-HS on RMMI bus portion 85B-11 during a HS-G4 data transmission operation, and asserts flag signal RX_HS-G4 to indicate readiness to receive a corresponding high-speed data stream DSR22-HS on RMMI bus portion 85B-12 during a HS-G4 data reception operation. Conversely, UFS controller 84-1B de-asserts flag signal TX_HS-G4 to indicate the subsequent transmission of a corresponding low-speed data stream DST21-LS at frequency f3 (e.g., 149 MHz) on RMMI bus portion 85B-11 during a corresponding low-speed data transmission operation, and de-asserts flag signal RX_HS-G4 to indicate readiness to receive a corresponding low-speed data stream DSR22-LS on RMMI bus portion 85B-12 during a low-speed data reception operation. Although the present invention is described with reference to high-speed and low-speed transmissions, the principles and concepts described herein are applicable to any number of transmission frequencies, and therefore the described high-speed and low-speed transmissions are not intended to be limiting.

According to another aspect of the present embodiment, speed converter module 120B is configured to control the UFS controller 84-1B to operate at the desired one-half operating speed (i.e., 146 MHz) by way of modifying (e.g., dividing by two) symbol clock control signals Tx_SymbolClk (TX_SYMBL_CLK) and Rx_SymbolClk (RX_SYMBL_CLK) transmitted from M-PHY PID 120B during HS-G4 operations. That is, standard MIPI UniPro V1.8 layers are configured such that the operating speed of UFS controller 84-1B is controlled during all data transmission operations by transmission symbol clock signal Tx_SymbolClk, and the operating speed of UFS controller 84-1B is controlled during all data reception operations by reception symbol clock signal Rx_SymbolClk. Moreover, standard M-PHY 4.0/4.1 layers are configured to generate symbol clock signals Tx_SymbolClk and Rx_SymbolClk. Accordingly, based on the ASIC/SoC-targeted circuit design code, M-PHY PID 120B generates transmission symbol clock signal Tx_SymbolClk at a high frequency (e.g., 292 MHz) during HS-G4 transmission operations, and M-PHY PID 120B generates reception symbol clock signal Rx_SymbolClk at the high frequency (e.g., 292 MHz) during HS-G4 reception operations. By including speed converter module 130B in the RMMI interface bus, speed converter module 130B is positioned to intercept and modify symbol clock signals Tx_SymbolClk and Rx_SymbolClk in a way that maintains the operating speed of UFS controller 84-1B at a frequency that can be implemented by a prototype system's PLD resources without requiring changes to the underlying ASIC/SoC-targeted circuit design code. As set forth above, operation of UFS controller 84-1B at 292 MHz presents a problem in many conventional FPGA-based prototype systems. In accordance with the present embodiment, speed converter module 130B avoids this problem by way of performing a divide-by-two operation that generates a modified symbol clock signal TX_SYMBL_CLK/2 having the desired 146 MHz frequency. That is, by arrangement allows the speed converter module 130B to reduce the operating speed of the UFS controller 84-1B to the desired one-half operating speed (i.e., 146 MHz) by way of configuring speed converter 130B to modify (divide-by-two) symbol clock signal TX_SYMBL_CLK and to pass modified symbol clock signal TX_SYMBL_CLK/2 to UFS controller 84-1B during HS-G4 (high-speed) data transmission operations. In contrast, speed converter module 130B is also configured to pass symbol clock signal TX_SYMBL_CLK without modification to UFS controller 84-1B during low-speed (e.g., 146 MHz) transmission operations. Note that this approach achieves operation of UFS controller 84-1B at the desired one-half operating speed (i.e., 146 MHz) while avoiding modifications to ASIC/SoC-targeted circuit design code because, as established by the ASIC/SoC-targeted circuit design code, M-PHY 120B generates the required 292 MHz Tx_SymbolClk signal and UFS controller 84-1B operates in compliance with the received Tx_SymbolClk signal. Similarly, the operating speed (data reception speed) of data received by the UFS controller 84-1B during HS-G4 reception operations is controlled by the modified reception symbol clock signal "Rx_SymbolClk/2" generated at 146 MHz, which is a modified (divided-by-two) version of the actual reception symbol clock signal "Rx_SymbolClk" generated by M-PHY 120B at 292 MHz. In one embodiment, speed converter module 130B is also configured to de-skew the modified Rx_SymbolClk/2 signal such that the rising edge of each sequential clock signal coincides with the arrival of a corresponding sequential data value at UFS controller 84-1B, whereby modified Rx_SymbolClk/2 signal causes UFS controller 84-1B to reads data values D from each incoming HS-G4 data stream and to effectively ignore all intervening filler data values F. Of course, the Tx_SymbolClk and Rx_SymbolClk signals generated by M-PHY 120B during low-speed data transmissions have a corresponding relatively low frequency (e.g., 146 MHz or lower), and are therefore passed to UFS controller 84-1B in an unmodified form during low-speed communications.

FIG. 4 shows a table indicating symbol clock frequencies and bit rate periods when a circuit is operating in HS-G3 & HS-G4, where the interface data uses a 40-bit wide parallel bus. Earlier versions of M-PHY V3.1, UniPro V1.6 (V1.61) and UFS V2.1 use to support link speeds up to HS-G3 gear in RATE A and RATE B. This would mean the RMMI data interface had to operate at max symbol frequency of 146 MHz when interface width is 40 bit wide. Now that MIPI MPHY V4.1 & MIPI UniPro V1.8 supports link speeds up to HS-G4 in RATE A and RATE B the RMMI data interface should operate at max symbol frequency of 292 MHz. When operating in HS-G4 RATE A/B, then the Symbol Clock frequency at RMMI will be 250 MHz/292 MHz respectively. In FPGA prototyping, meeting the timing requirement for HS-G4 RATE A/B in controller logic without optimizing the design paths would be difficult. The present invention provides a mechanism whereby the ASIC/SoC-targeted circuit design can remain as-is while providing a prototype (modified) circuit design including the speed converter module described herein that addresses the timing closures issue in a prototype system and at the same time retains the end-to-end functionality of the ASIC/SoC-targeted circuit design.

Figure 5:
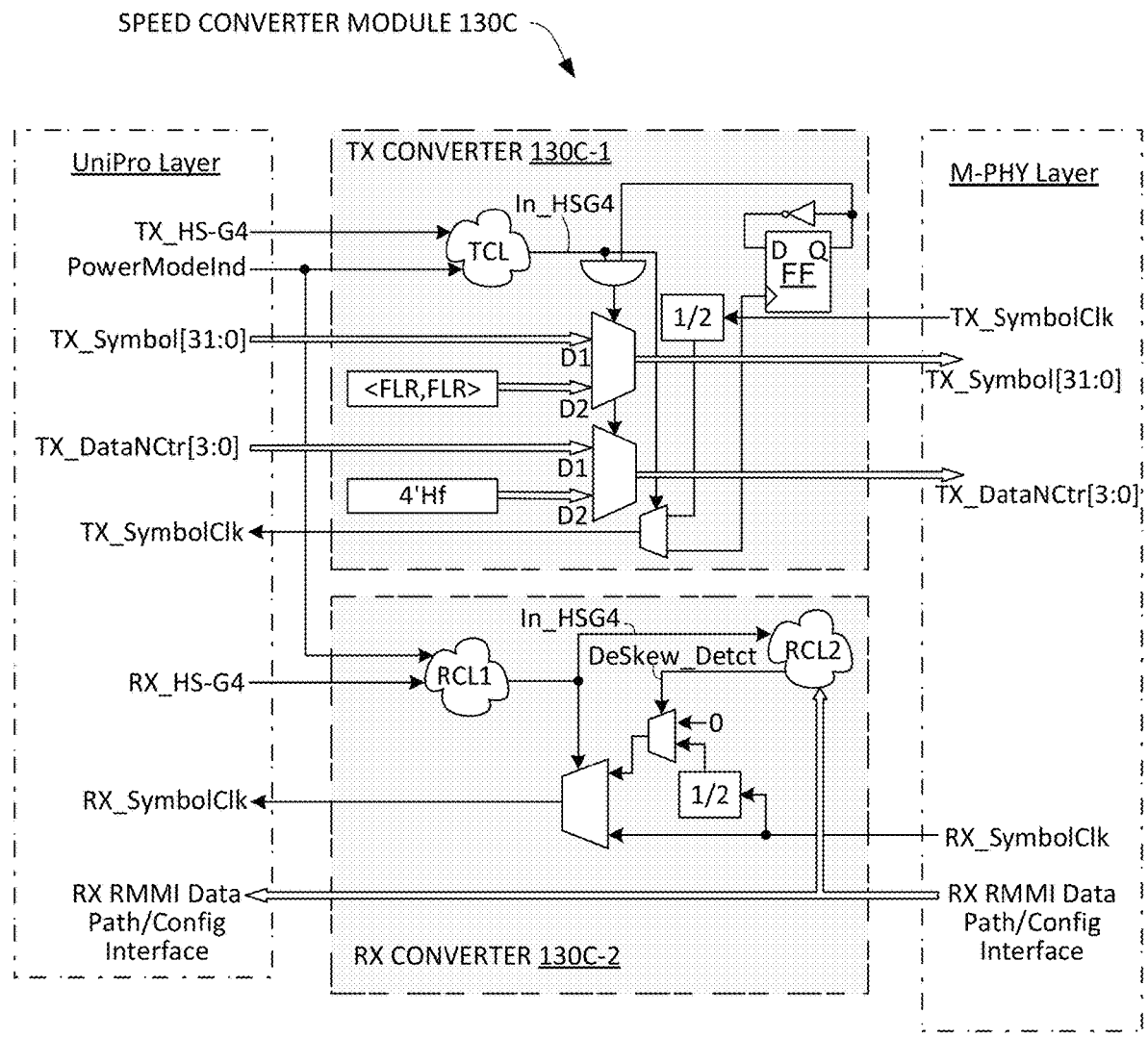
FIG. 5 is a simplified block/circuit diagram showing a speed converter module according to another exemplary embodiment of the present invention.

FIG. 5 depicts a speed converter module 130C including internal architectural details associated with transmit and receive RMMI data paths according to another exemplary embodiment. Speed Converter 130C receives control signals PowerModeInd, TX_HS-G4 & RX_HS-G4 as inputs, where signal PowerModeInd corresponds to the DME_POWERMODE.ind( ) primitive defined by MIPI UniPro V1.8 specification. A UniPro IP layer will have this primitive as output port. The TX_HSGear4 and RX_HSGear4 signals do not have a corresponding primitive defined by specification. These are expected as additional sideband output signals coming from the UniPro IP. Hence in this proposal the UniPro IP is referred as not a black box. It is assumed that UniPro IP will be providing such two output signals. Expected functionality of TX_HSGear4 port is such that, when the UniPro transmit path enters HS-G4 then TX_HSGear4 would be asserted (go HIGH), and stays HIGH while the UniPro transmit path is in HS-G4 (high-speed operating mode). Once UniPro transmitter changes to any other gear or mode then TX_HSGear4 is de-asserted (goes to LOW). Expected functionality of RX_HSGear4 port is such that, when the UniPro receive path enters HS-G4 then RX_HSGear4 would go HIGH and stays HIGH while UniPro receive path remains in HS-G4, and is then de-asserted (goes to LOW) when the UniPro receiver changes to any other gear or mode.

TX SPEED CONVERTOR BLOCK 130C-1: Using the PowerModeInd and TX_HSGear4 signals, the cloud logic TCL is configured to assert the In_HSG4 signal (flag), which ensures correct timing for the clock and data path shifts between HS-G4 speed and another low-speed operation. The right time falls within PA_SaveConfigTime tenure. UniPro specifications mention that once the power mode change handshake completes it has to wait for PA_SaveConfigTime to lapse before starting new burst. This is when the M-PHY changes the frequency on TX_SymbolClk. When In_HSG4 flag is LOW, the Tx_SymbolClk generated by M-PHY will be directly passed to UniPro IP, and when this flag is HIGH then divide-by-2 modification of the Tx_SymbolClk signal will be performed (indicated by block labeled "1/2"), and the modified Tx_SymbolClk/2 signal will be passed to the UniPro IP. This ensures that the maximum frequency that UniPro IP will experience is 146 MHz. When In_HSG4 flag is LOW (e.g., during low-speed transmissions) UniPro IP and M-PHY are operating at same frequency. But when In_HSG4 flag is HIGH, M-PHY is operating at 292 MHz and UniPro IP is operating at 146 MHz (Tx_SymbolClk/2) frequency. During this time the UniPro IP generates Tx_Symbol on every edge of (Tx_SymbolClk/2). The TxSymbol is then passed to M-PHY for one rising edge of Tx_SymbolClk whereas on the next rising edge of Tx_SymbolClk the locally generated <FLR,FLR><FLR,FLR> symbols (filler data values) are supplied to the M-PHY. The Tx_DataNCtrl signal is supplied in similar manner to M-PHY. When Tx_Symbol signal is fed with two FLR pairs, Tx_DataNCtrl is supplied with a 4hF value. The Alternate_edge signal along with the In_HSG4 signal takes care of doing this operation using the MUX as shown in FIG. 5. All other TX RMMI data ports can be directly tied between UniPro IP and M-PHY because no changes are expected on these other ports. The TX block shows simple version of Alternate_edge flag generation. However, the generation of Alternate_edge flag has to be such a way that, it will monitor the Deskew being transmitted by Unipro IP and from there on it will start toggling. Meaning the toggle operation starts after DeSkew being passed to M-PHY.

RX SPEED CONVERTOR BLOCK 130C-2: RX cloud logic RCL1 is configured to use PowerModeInd & RX_HSGear4assert to assert an In_HSG4 signal to ensure proper clock and data path shifting. The proper shift time concept is same as mentioned in Tx Speed Convertor block description (above). The RX RMMI data path consists of Rx_SymbolClk, Rx_Burst, RxPhyDORDY, RxDataNCtrl, Rx_PhySymbolErr and Rx_Symbol. In RX RMMI data path, the generated RX RMMI Data ports (ex: Rx_Symbol) is directly supplied to UniPro IP. So no manipulation takes place on data path as such (i.e., data stream DSR21 received from the M-PHY is passed as-is as data steam DSR22 to the UniPro IP layer). However, the M-PHY generated Rx_SymbolClk is conditionally passed to the UniPro IP; that is, when the UniPro IP is operating in HS_G4, if the In_HSG4 signal is HIGH then Rx_SymbolClk/2 is passed to UniPro, otherwise the actual (unmodified) Rx_SymbolClk is supplied to UniPro. When the In_HSG4 flag is HIGH, the produced Rx_SymbolClk/2 is not necessarily be passed to Rx UniPro. Instead, the Rx_SymbolClk/2 clock signal has to be passed to the UniPro IP in such a way that the rising edge of each sequential clock pulse coincides with arrival of a corresponding sequential data value at the UniPro IP, and not a filler data value interspersed in the high-speed data stream DSR21-HS as described above. That is, if the Rx_SymbolClk/2 clock signal is not properly synchronized with the incoming high-speed data stream, then UniPro IP will incorrectly sample filler values instead of data values. One way to achieve the proper timing is to locate the DeSkew pattern being sent by the M-PHY, and from then on only pass the Rx_SmbolClk/2 clock signal to UniPro. This is achieved by RX cloud logic RCL2, which is configured to generate a flag DeSkew_Detct only when In_HSG4 is asserted (HIGH), and by way of monitoring the Rx_Burst, RxPhyDORDY, RxDataNCtrl, Rx_PhySymbolErr and Rx_Symbol signals to identify DeSkew patterns being passed by M-PHY. With this arrangement, the role of the DeSkew_Detct signal is to control a multiplexer that passes the correct edge of the Rx_SymbolClk/2 clock signal. The DeSkew_Dect flag used here is to provide a concept of which divide by two Rx_SymbolClk to be passed to UniPro IP and not an actual implementation content.

SOLUTION IF UNIPRO IP IS BLACK BOX: In FIG. 5, in various places TX/RX_HSGear4 ports are referred with the expectation that UniPro IP is not a black box and it provides those output signals to indicate UniPro IP layer is operating in HS-G4 or otherwise. However, if the UniPro IP is black box and no such port is available the TX and RX Speed Convertor Logic blocks need to have additional logic to identify when the UniPro is operates in HS-G4 transmission/reception mode. For this, the TX Speed Convertor block needs to monitor the RMMI TX Config interface to know when UniPro IP configures the TX MODE (0x21) and TX_HSGEAR (0x23) attribute for HS-G4 operation, followed this it should see a successful DME_PowerModeInd. Based on this monitoring the TX Speed Convertor identifies whether UniPro will start operating in HS-G4 in next burst or otherwise. This similar logic is required inside RX Speed Convertor by watching RMMI RX Config interface for RX_MODE (0xA1) and RX_HSGEAR (0xA3) attributes to decide the same. However, since the FPGA prototype will not have a black box IP and gathering such information from UniPro IP should be feasible.

Figure 6:
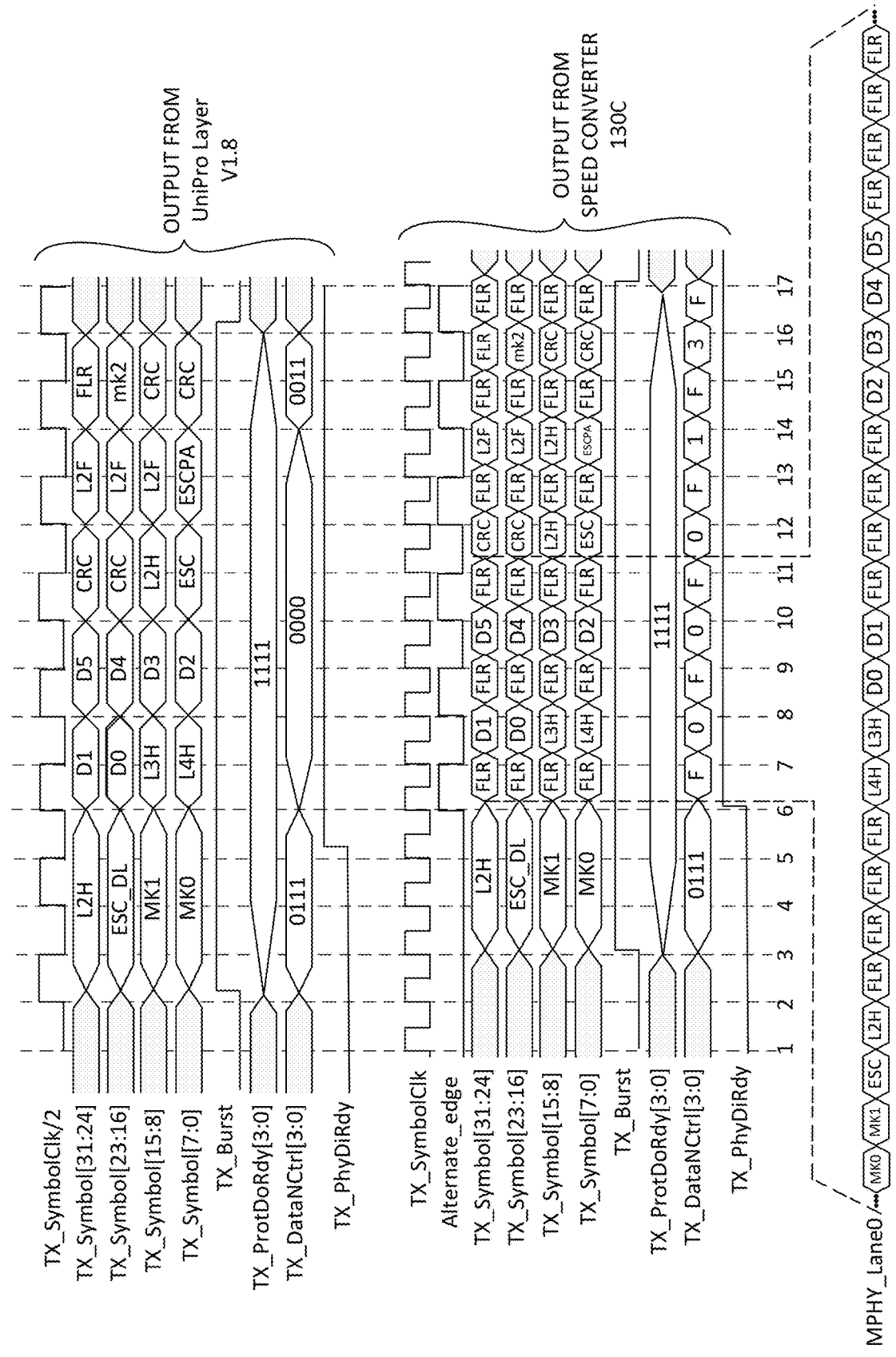
FIG. 6 includes wave forms (timing diagrams) depicting exemplary signals transmitted from a UniPro IP circuit during HS-G4 transmissions.

FIG. 6 shows exemplary wave forms (timing diagrams) depicting various signals transmitted from a standard UniPro IP circuit during HS-G4 transmission operations, corresponding signals generated by a speed converter of the present invention (e.g., speed converter 130C shown in FIG. 5), and a portion of corresponding serial line signal MPHY_Lane0 generated by a standard M-PHY layer (e.g., on transmission lines TX+ and TX− of transmission structure 89; FIG. 1) in response to the signal received from the M-PHY layer (note that signal MPHY_Lane0 is depicted for single-lane interface, and can be modified using known techniques for a two-lane interface). As explained above, in all other mode and gears the transmission and reception RMMI data interface works as if there is no speed converter block. That is, the UniPro IP utilized in the UFS controller works with the same Tx/Rx_SymoblClk frequency that is supplied by the M-PHY. However, when the UniPro IP is controlled (e.g., by processor 83, shown in FIG. 1) to operate in HS-G4 (high speed) TX or RX operations, then the UniPro transmitter implemented in the prototype system operates at frequency f1 (e.g., one-half of the speed of clock signal Tx_SymbolClk generated by the M-PHY, i.e., Tx_SymbolClk/2—note that the Tx_SymbolClk signal corresponds with the TX_SYMBL_CLK/2 signal referenced with respect to FIG. 3). The Alternate_edge signal indicated in FIG. 6 toggles when a DeSkew pattern is transmitted by the UniPro IP. The UniPro IP places the DeSkew pattern on Tx_Symbol[15:0] and at clock number 6 it is transferred to the M-PHY as signal TX_PhyDiRdy and asserted on that clock edge. Hence, the Alternate_edge signal port goes HIGH, and from this edge onwards toggling of Alternate_edge occurs until the end of the current burst. This operation is repeated for every transmission burst signaled by assertion of signal Tx_Burst. In other words, the speed convertor module monitors the asserted/de-asserted state of signals Tx_Burst, TxProtDoRdy, TxDataNCtrl, Tx_PhyDiRdy and Tx_Symbol to determine when a Deskew pattern is transferred to the M-PHY. From this time onwards the toggling of Alternate_edge takes place as shown in the wave form of FIG. 6. From here on, whenever the Alternate_edge is HIGH the Tx_Symbol is driven with FLR pair and Tx_DataNCtrl drive with hF. Because of this behavior the same data transmission operation at the UniPro IP output is seen with alternate FLR values at the speed convertor module output. This approach does not hamper the functionality because specification does not restrict the transmission of filler values in the middle of transmitted packet frames. It is important to note that the modification of the transmitted data stream (i.e., the addition of filler (FLR) values) should start in the manner depicted in FIG. 6. If this is ensured, then no special circuitry is required on the receiver side. In FIG. 6, the effective data on the serial line is also shown. The transmitted data will have four symbols of actual data packet and next four symbols are only FLRs. This will continue for the entire packet transmission.

During data reception operations, the M-PHY receiver passes the entire received data content (i.e., data and filler values), and hence the entire content will be passed on the RX RMMI data path to the speed converter module. However, the receiver portion of the speed converter module checks for the DeSkew pattern, and from then on applies the divide-by-2 clock adjustment in such a way that the rising edge inside the UniPro IP only occurs when actual data is present in the data stream passed from the speed converter module to the UniPro IP (i.e., such that no clock edges occur when filler values (FLRs) are present, whereby only data is received by the UniPro IP).

Figure 7:
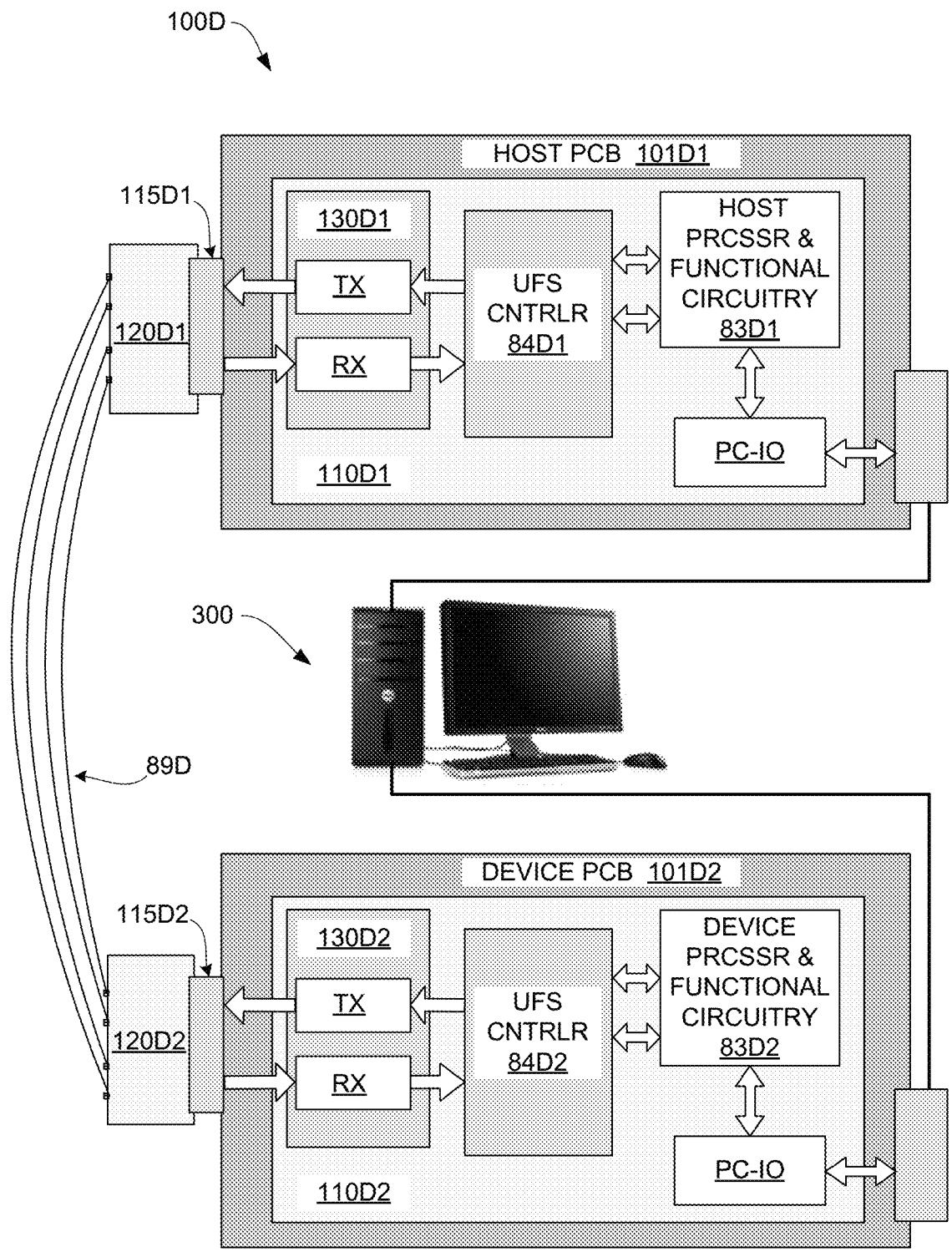
FIG. 7 is diagram depicting an FPGA-based prototyping system including speed converter modules in accordance with another exemplary embodiment of the present invention.
Figure 8:
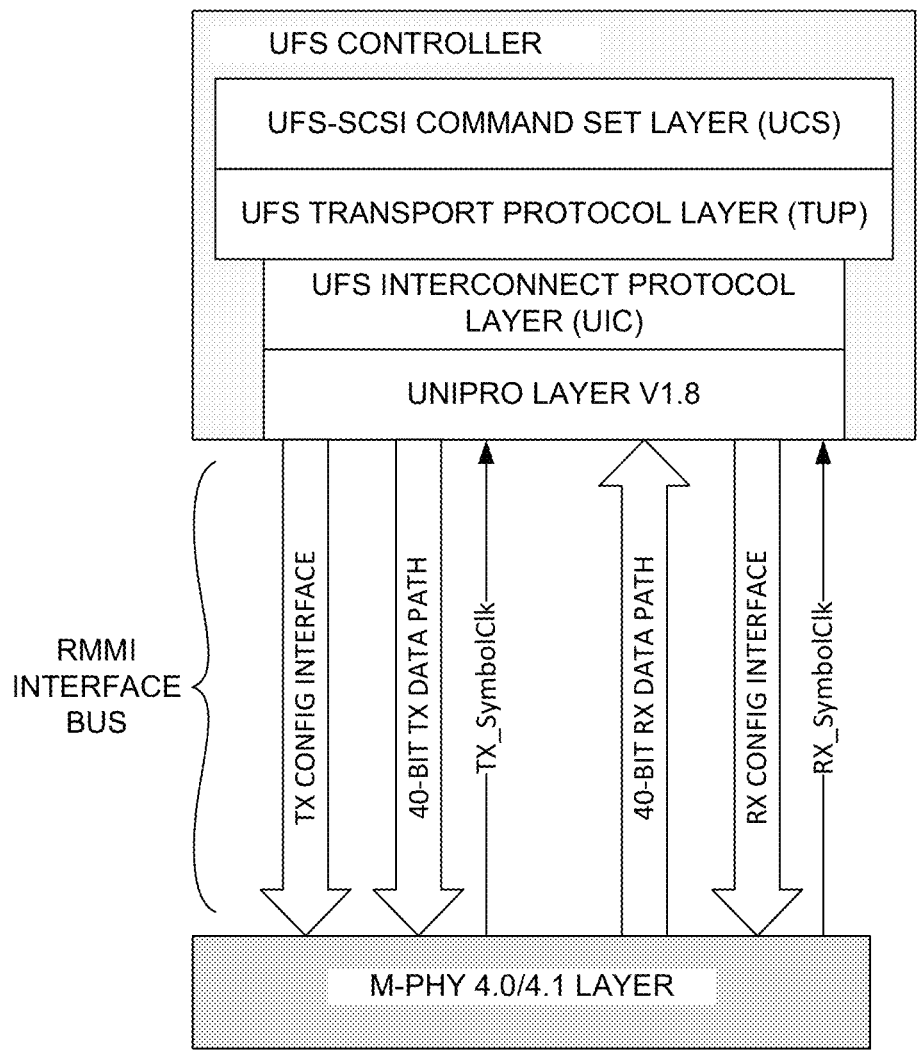
FIG. 8 is a simplified block/circuit diagram depicting a conventional UFS controller block of a type utilized in circuit designs that implement UFS high-speed communication protocols.

FIG. 7 shows a modified prototyping system 100D in which two speed converter modules 130D1 and 130D2 are respectively implemented on a host PCB 101D1 and a device PCB 101D2. Host PCB 101D1 includes an FPGA 110D1 and a M-PHY PID 120D1 that are operably connected by an interconnect structure 115D1, and device PCB 101D2 includes an FPGA 110D2 and a M-PHY PID 120D2 that are operably connected by an interconnect structure 115D2 and a transmission structure 89D (e.g., SMP to SMP co-axial cables). In each case FPGAs 110D1 and 110D2 are respectively programmed to implement the speed convertor modules 130D1 and 130D2, associated UFS controllers 84D1 and 84D2 that include MIPI UniPro V1.8 IPs, and other circuitry 83D1 and 83D2 that includes processors and other functional circuitry that operably describes associated host/device portions of a circuit design, along with software tools (e.g., PC-input/output modules) that serve to identify system 100D as an I/O device to a PC (computing) system 300. In one embodiment, PC system 300 is configured to implement an EDA prototyping tool configured to perform the method described above, thereby configuring FPGAs 110D1 and 110D2 in accordance with a modified version of an associated ASIC/SoC-targeted circuit design.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific circuit design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

Figure 10B:
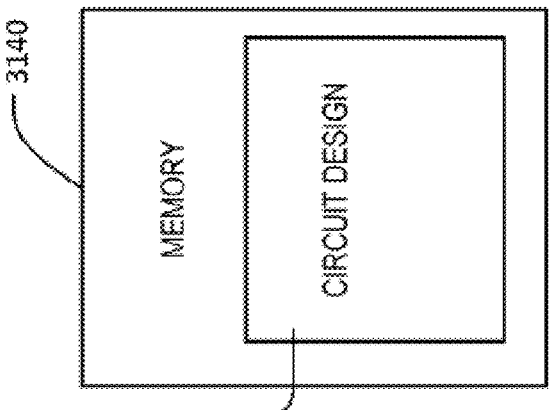
FIGS. 10A, 10B and 10C are simplified block diagrams of a computer system suitable for use with embodiments of the technology, as well as circuit design and circuit embodiments of the technology.
Figure 10C:
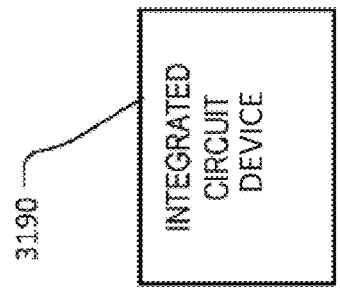
Figure 10A:
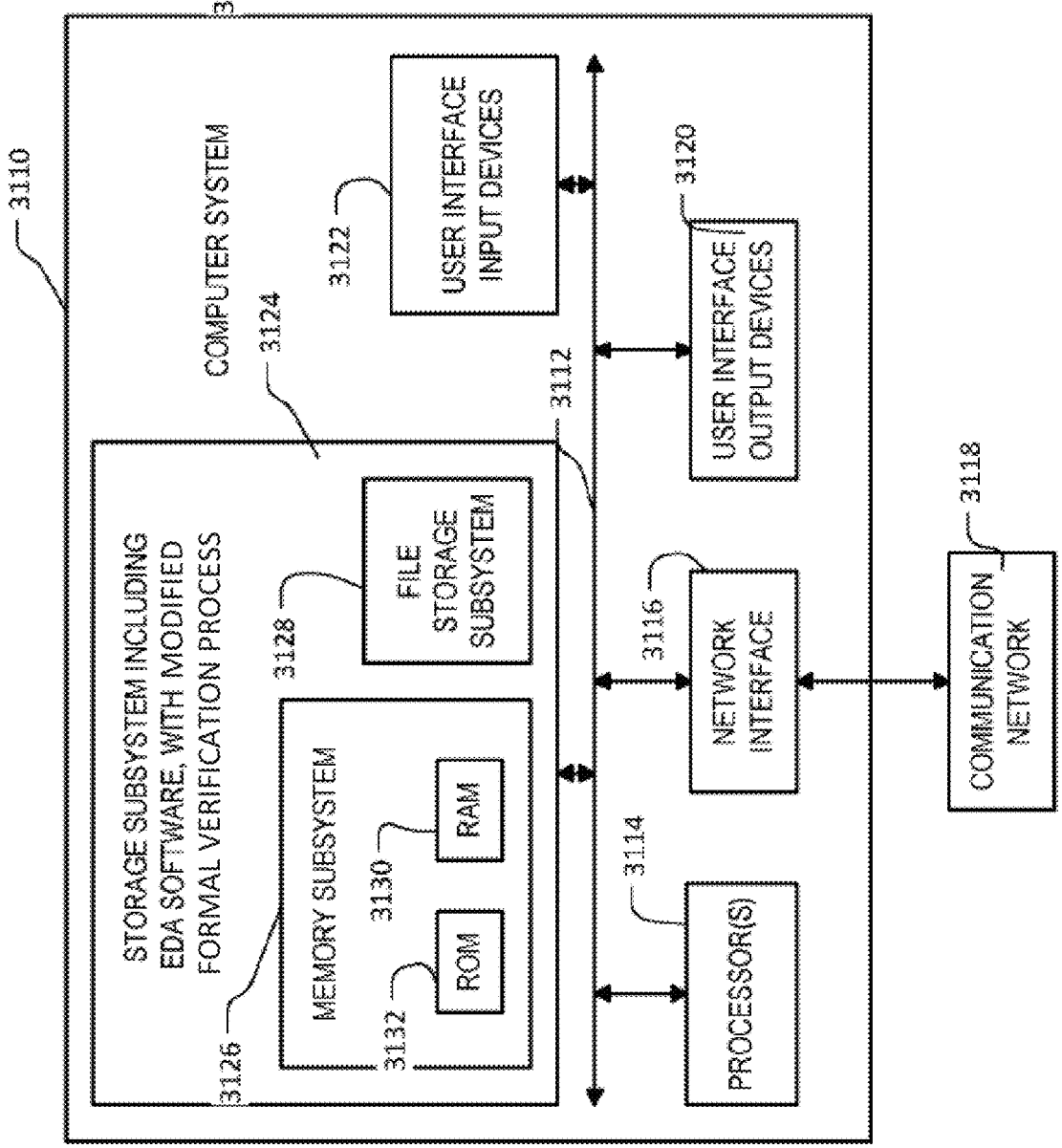

FIGS. 10A, 10B and 10C are simplified block diagrams of a computer system suitable for implementing an EDA-based prototyping tool or otherwise performing the methodology described above to produce prototype systems of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including a prototyping tool of the type described above, computer system 3110 depicted in FIG. 10A represents an electronic structure suitable for creating a modified circuit design including a speed converter module of the type described above. Specifically, the cell library contains at least one cell including information required to implement a speed converter module in a modified version of a circuit design. In addition, the EDA tool includes software tools suitable for modifying the ASIC/SoC-targeted circuit design to include any changes that are deemed necessary by way of operating and analyzing a prototype system produced in accordance with the modified circuit design. As mentioned above, a final ASIC/SoC-targeted circuit design that does not include the speed converter modules described herein is then transmitted to a fabrication facility for production of a physical ASIC or SoC IC device (chip).

FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit (e.g., a SoC device or an ASIC) that utilizes HS-G4 data transmissions. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 10C is a block representing an integrated circuit 3190 (e.g., an SoC device or an ASIC) designed and fabricated in accordance with the processes described above, where circuit 3190 is fabricated in accordance with the circuit design of data structure 3180 (see FIG. 10B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified. For example, although the invention is described with reference to prototyping ASIC/SoC-targeted circuit designs that implement HS-G4 data transmissions, the methods and features of the present invention may beneficially be utilized to efficiently prototype circuit designs that implement other high-speed data transmissions. In addition, although the speed converter module is described herein with reference to a divide-by-two operation applied to the symbol clock signals Tx_SymbolClk and Rx_SymbolClk, a speed converter module may be beneficially utilized that performs a divide-by-n operation, where n represents any integer or a fraction thereof.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A method for prototyping a circuit design including a controller and a physical interconnect layer connected by a standard interface bus and configured to communicate with an external device using a high-speed transmission frequency, the method comprising:

generating a modified circuit design including a speed converter disposed in the standard interface bus, wherein the speed converter is configured to convert a first data stream including data values transmitted at a first frequency into a second data stream including both said data values and one or more filler values transmitted at a second frequency, wherein the first frequency is lower than the second frequency; and generating a physical prototype system that implements the modified circuit design, said physical prototype system including at least one programmable logic device (PLD) and a physical interconnect device operably connected by an interconnect structure that forms at least a portion of said standard interface bus, wherein said at least one PLD is configured to implement said controller and said physical interconnect device is configured to implement said physical interconnect layer, and wherein said second frequency of said second data stream facilitates re-transmission of said data values and said one or more filler values from said physical interconnect device at said high-speed transmission frequency.

2. The method of claim 1, wherein generating said modified circuit design comprises implementing the standard interface bus using a first bus portion and a second bus portion such that the speed converter is coupled to the controller by said first bus portion and the speed converter is coupled to the physical interconnect layer by said second bus portion, whereby the speed converter receives the first data stream from the controller via the first bus portion and transmits the second data stream to the physical interconnect layer via the second bus portion.

3. The method of claim 2, wherein generating said modified circuit design comprises configuring the speed converter to receive a third data stream including both data values and filler values from the physical interconnect layer via the second bus portion, and to transmit a fourth data stream to the controller via the first bus portion such that the controller receives only said data values transmitted in said third data stream at said first frequency.

4. The method of claim 3,
wherein the circuit design is defined such that the physical interconnect layer is implemented using a standard MIPI M-PHY layer configured to communicate with said external device using a High-Speed Gear 4 (HS-G4) transmission having said high-speed transmission frequency of approximately 11.6 Gbps, the standard interface bus is implemented using a standard 40-bit RMMI bus, and the controller is implemented using a UFS controller configured to transmit data and receive data on each line of said 40-bit RMMI bus at said second frequency equal to approximately 292 MHz during said HS-G4 data transmissions, and
wherein generating said modified circuit design comprises configuring said speed converter such that said first frequency of said fourth data stream is equal to approximately 146 MHz.

5. The method of claim 3, wherein generating the physical prototype system further comprises configuring said at least one PLD to implement said speed converter, the first bus portion and part of the second bus portion.

6. The method of claim 3,
wherein generating said modified circuit design comprises configuring said speed converter to modify a symbol clock signal received from the physical interconnect layer and to pass said modified symbol clock signal to said controller during a high-speed transmission operation, and to pass said symbol clock signal without modification to said controller during a low-speed transmission operation, and
wherein the circuit design is defined such that the controller transmits said first data stream during said high-speed transmission operation in accordance with said modified symbol clock signal, and generates a fifth data stream including data values transmitted at a third frequency during said low-speed transmission operation in accordance with said unmodified symbol clock signal, said third frequency being lower than said second frequency.

7. The method of claim 6, wherein the circuit design is defined such that the controller asserts a high-speed transmission signal during each said high-speed transmission operation, and de-asserts said high-speed transmission signal during each said low-speed transmission operation, and
wherein generating said modified circuit design comprises configuring said speed converter to distinguish between said high-speed and said low-speed transmission operations based on said assertion/de-assertion of said high-speed transmission signal.

8. The method of claim 3, wherein generating said modified circuit design comprises:
configuring said speed converter to modify a symbol clock signal received from the physical interconnect layer and to pass said modified symbol clock signal to said controller during a high-speed reception operation, and to pass said symbol clock signal without modification to said controller during a low-speed transmission operation,
further configuring said speed converter such that said fourth data stream is identical to said third data stream, and
wherein the circuit design is defined such that the controller only captures said data values from said fourth data stream during said high-speed transmission operation in accordance with said modified symbol clock signal.

9. A prototype system for prototyping a circuit design including a Universal Flash Storage (UFS) controller and a M-PHY interconnect layer connected by a standard Reference M-PHY Module Interface (RMMI) bus and configured to communicate with an external device using a High-Speed Gear 4 (HS-G4) transmission frequency, the prototyping system comprising:
at least one programmable logic device (PLD) configured to implement said UFS controller;
an M-PHY physical interconnect device (PID) configured to implement said M-PHY interconnect layer;
an interconnect structure operably connected between said PLD and said M-PHY PID and being operably configured to implement at least a portion of said standard RMMI interface bus; and
a speed converter module disposed operably connected in the standard RMMI interface bus such that the speed converter module is coupled to the UFS controller by a first RMMI interface bus portion and to the M-PHY interconnect layer by a second RMMI interface bus portion,
wherein the speed converter is configured to convert a first data stream received from the UFS controller via the first RMMI interface bus portion into a second data stream that is transmitted to the M-PHY interconnect layer via the second RMMI interface bus portion,
wherein said first data stream includes data values transmitted at a first frequency, and
wherein said second data stream includes both said data values and one or more filler values transmitted at a second frequency that is greater than the first frequency.

10. A prototyping tool implemented on a computer and utilized to prototype a circuit design including a controller and a physical interconnect layer connected by a standard interface bus and configured to communicate with an external device using a high-speed transmission frequency, the prototyping tool being configured to generate a modified circuit design including a speed converter disposed in the standard interface bus such that the speed converter is coupled to the controller by a first bus portion and to the physical interconnect layer by a second bus portion, wherein the speed converter is configured to convert a first data stream including data values that are received from the controller via the first bus portion at a first frequency into a second data stream including both said data values and one or more filler values that are transmitted to the physical interconnect layer via the second bus portion at a second frequency, wherein the first frequency is less than the second frequency, and wherein said second frequency of said second data stream facilitates re-transmission of said data values and said one or more filler values from said physical interconnect device at said high-speed transmission frequency.

\* \* \* \* \*